(12) United States Patent
Dinel

(10) Patent No.: US 6,645,267 B1
(45) Date of Patent: Nov. 11, 2003

(54) PLANT GROWING MEDIA

(76) Inventor: Henri Dinel, 104 Chemin Juniper, Chelsea, Quebec (CA), J0X 1N0

( * ) Notice: Subject to any disclaimer, the term of this patent is extended or adjusted under 35 U.S.C. 154(b) by 134 days.

(21) Appl. No.: 09/680,415

(22) Filed: Oct. 6, 2000

Related U.S. Application Data

(63) Continuation-in-part of application No. 09/340,000, filed on Jun. 25, 1999, now abandoned.

(51) Int. Cl.$^7$ .............................. C05F 3/00; C05F 3/02; C05F 11/00; C05F 11/02; C05F 11/04
(52) U.S. Cl. ................ 71/11; 47/58.1 SC; 47/DIG. 10; 71/21; 71/23; 71/24; 71/27; 71/28; 71/34; 71/58; 71/63; 71/903
(58) Field of Search ................................ 71/11, 28, 34, 71/63, 61, 58, 23, 24, 903, 21, 27; 47/1.01 R, 58.1 SC, DIG. 10

(56) References Cited

U.S. PATENT DOCUMENTS

| | | | |
|---|---|---|---|
| 3,050,383 A | | 8/1962 | Wilson |
| 5,337,496 A | | 8/1994 | Glorioso |
| 5,368,626 A | | 11/1994 | Schnuda |
| 5,466,273 A | | 11/1995 | Connell |
| 5,472,475 A | | 12/1995 | Adam |
| 5,662,724 A | | 9/1997 | Kim |
| 6,302,936 B1 | * | 10/2001 | Adam ............................ 71/13 |
| 6,372,007 B1 | * | 4/2002 | Munoz .......................... 71/15 |

FOREIGN PATENT DOCUMENTS

| | | |
|---|---|---|
| DE | 197 50 951 | 6/1999 |
| EP | 0 123 570 | 10/1984 |
| EP | 0 759 323 | 2/1997 |
| FR | 2 279 458 | 7/1974 |
| GB | 1 485 236 | 9/1977 |

* cited by examiner

*Primary Examiner*—Wayne A. Langel
(74) *Attorney, Agent, or Firm*—Robert A. Wilkes; Robert G. Hendry

(57) ABSTRACT

A process for converting composted organic materials produced by optimized composting procedures into plant growing media for agronomic and other uses. The raw organic matter is first processed into compost by optimized standard methods. If desired, the raw organic matter can be of "organic" sources to provide plant growing media certifiable for use for organically grown food crops. The finished compost is screened to remove coarse particles above about 1 cm diameter, which are recycled back to the composting process. The composted material below approximately 1 cm diameter is further screened to separate out the particles below about 1 cm diameter and above 1 mm. This material is further separated into two size ranges: particles between 1 mm and up to 4 mm diameter (medium), and particles between 4 mm and 1 cm diameter (coarse). The medium and coarse compost components are mixed together in various ratios with an appropriate amount of humified organic matter, which can be any suitable organic matter with a particle size of less than about 1 mm, and with a cation exchange capacity of from about 100 meq/100 g to about 400 meq/100 g, and an appropriate bulking agent to produce plant growing media. Suitable humified organic matter sources include compost, black earth, and low grade charcoal. Suitable bulking agents include one or more of shredded plastic, wood chips or brick fragments. The advantage of this invention is that it contains a significant amount of essential plant nutrients (NPK) due to the optimized composting process. In many cases, the amount of essential plant nutrients will be sufficient for commercial crop production. If desired, fertilizer is also added to provide a desired N:P:K ratio. The plant growth media can be used to grow crops and house plants.

18 Claims, No Drawings

PLANT GROWING MEDIA

This is a continuation-in-part of application Ser. No. 09/340,000 filed Jun. 25, 1999 now abandoned.

FIELD OF THE INVENTION

This invention relates to plant growing media, and to a process for converting composted organic materials produced by optimised composting procedures into plant growing media for agronomic and other uses.

BACKGROUND OF THE INVENTION

The successful production of crops in greenhouses requires an adequate and consistent quality of growing media for the crops. This can range from natural soils to soilless hydroponics. The key characteristics of growing media include consistent bulk density, ease of use, freedom from plant diseases and pests, and the ability to supply plant nutrients and water.

A high proportion of the potting soils and the like currently commercially available utilize peat, derived from harvesting natural peat bogs. For example Kim in U.S. Pat. No. 5,662,724 describes an artificial soil composition in which the major ingredients are in percentages by weight 10–30% peat, 10–30% granular soil, 40–60% sewage sediment, and 24–45% sewage pulp sludge. This practice of using peat in potting soils and the like can be environmentally unsound and results in the loss of environmentally sensitive bog areas.

Composting is a common process used to recycle organic wastes. The composting process reduces the volume of organic material and stabilizes nutrients, particularly nitrogen. Composting curtails environmental pollution and reduces, often significantly, the amount of recyclable organic matter requiring another method of disposal, which often is to dump it into a landfill site. Composting can also be used to process materials which cannot easily be dumped into a landfill site, such as the liquid raw manures obtained from the intensive rearing of farm animals in barns. Further, composting can be applied to waste organic materials derived from certified organic agricultural procedures. During the composting process, carbon and nitrogen compounds in the organic wastes are transformed by successive microbial populations into more stable complex forms which chemically and biologically resemble humic substances.

The commercial viability of existing composting facilities is primarily based on the operator receiving a fee for accepting the organic material from waste generators. The emphasis in most of these waste management composting facilities is the composting of large volumes of material to reduce the amount of material. The retention time in the composting channels or windrows is minimized to allow the maximum flow through. Sometimes the compost is allowed to cure outside the composting system to complete the bio-stabilization process. Under some commercial systems, little effort is made to maximize the quality of the finished compost material.

BRIEF SUMMARY OF THE INVENTION

This invention seeks to overcome the long term consequences of the use of peat based growing media by providing agronomically acceptable growing media which are based on what are essentially otherwise waste materials. In a more particular embodiment, this invention seeks to provide agronomic growing media which are acceptable for certified organic cultivation in the greenhouse environment, as well as in field and garden use.

The fertility, and consequently usefulness, of agronomic growing media involve a complex series of interactions between the medium and the plants being grown in it. These include media pH, the form of the available resident nutrients, temperature, moisture content, media atmosphere, and the microbial populations present. The incorporation of compost into plant growing media can influence all of these factors. However, the indiscriminate use of poor quality compost in plant growing media can be counter productive, and can result in production fertility problems.

The development of the composting process to minimize the volume of waste organic material going to landfill sites has resulted in substantial quantities of compost becoming available, in which the quality of the compost can be maximized, so that the compost provides as much benefit in the growing media as can reasonably be achieved.

This invention utilizes high quality compost from optimized standard composting processes. This invention requires the composting process to be completed under strictly controlled conditions to produce fully bio-stabilized compost of known values of nitrogen, phosphorous and potash. The composting process is also completed under conditions which minimize the loss of nutrients due to volatilization and leaching. The amount of nitrogen, phosphorous and potash in the compost can be influenced by the selective use of the raw organic matter to be composted.

Further, the compost can be derived from certifiably clean "organic" materials, and thus can provide plant growing media suitable for certified organically grown food crops.

DETAILED DESCRIPTION OF THE INVENTION

Thus, in its broadest embodiment, this invention seeks to provide a process for preparing plant growing media consisting essentially of:

(i) screening a fully bio-stabilized compost material to provide a retained fraction of particles under about 1 cm diameter, and a rejected fraction of particles having a diameter in excess of about 1 cm;

(ii) screening the retained fraction from step (i) into three further fractions to provide a rejected fines fraction below 1 mm, a medium fraction of from 1 mm to 4 mm, and a coarse fraction of from 4 mm to 1 cm;

(iii) remixing metered amounts of the retained medium and coarse fractions from step (ii) with an agronomically acceptable amount of humified organic matter having a particle size of less that 1 mm, and a cation exchange capacity of from about 10 meq/100 g to about 400 meq/100 g; and (iv) remixing metered amounts of the product produced in step (iii) with an agronomically acceptable amount of a suitable bulking agent, to provide plant growing media product suitable for agricultural use.

Complete bio-stabilization in itself is not a new process in the context of the composting process. This invention requires the use of compost prepared by a process in which the bio-stabilization process has been fully completed during the composting process. The retention time in the composting process, depending upon moisture, temperature, aeration and feedstock mixes, must be sufficient to allow for full bio-stabilization. In addition, all good manufacturing practices for making compost that minimize losses of nutrients due to volatilization and leaching must be followed. The water content of the feedstock material is also adjusted to ensure optimum bio-stabilization, so that the final compost product used to make this invention is a dry particulate material.

In the first step of the process of this invention, the fully bio-stabilized and nutrient rich compost is screened to provide a retained fraction and a reject fraction. The particles greater than 1 cm diameter are rejected and further processed.

In the second step of the process of this invention, the compost fraction retained in the first step is separated into specific particle size components. The retained compost fraction is screened and separated into three fractions, which are:

(a) "coarse" particles between 4 mm and 1 cm diameter;
(b) "medium" particles between 1 mm and 4 mm diameter; and
(c) "fine" particles below 1 mm diameter.

These three fractions are accumulated conveniently in separate metering hoppers. The third fraction of fine particles below 1 mm diameter is separated and used for other purposes.

In the third step of the process of this invention, metered amounts of the coarse and medium fractions are transferred to a mixer scale and remixed under controlled conditions. The weight ratio of coarse fraction to medium fraction may vary, depending on the desired characteristics of the plant growing media. Preferred ratios are 1:1 and 2:3 by weight of medium to coarse.

In the fourth step in the process of this invention an appropriate amount of humified organic matter is added to the coarse/medium mixture from the third step. The humified organic matter can be any suitable organic matter with a particle size less than about 1 mm, and which has a cation exchange capacity of from about 100 meq/100 g to about 400 meq/100 g. In this context, the cation exchange capacity is defined as the total amount of exchangeable cations that a soil can absorb in its natural state. Suitable sources of humified organic matter include compost, black earth and low grade charcoal. The humified organic matter can be added to the coarse/medium mixture at a rate of between about 10% and 60% by weight of the final mixture. "Black earth" is a commercial soil product in which decomposition of the plant organic matter has reached a more advanced stage, so that part of the organic material has passed into the condition known as humus.

In the fifth step of the process of this invention, an appropriate quantity of bulking agent is then added to the medium/coarse compost mixture to form specialized plant growing media. The bulking agent can be chosen from a wide range of possible materials, depending in part on availability, cost, and the properties required in the final product. Typical bulking agents include but are not limited to shredded plastic, brick fragments, wood chips, rock wool, vermiculite, or any of the bulking agents presently used by the horticulture industry. Both the amount and type of bulking agent used are chosen to suit the crops or plants to be grown in the final product.

In the sixth step of the process of this invention, if desired, nutrients in the form of organic or chemical fertilizers can also be incorporated in metered amounts into the plant growing media. If the plant growing media are intended for certified organically grown crops, then all fertilizer used must meet the organic certification requirements. The amount of fertilizer added to the plant growing media will depend on the natural nutrients in the medium/corse compost and the level of nutrients desired in the finished plant growing media products. The addition of fertilizers at this stage can thus be used to adjust the N:P:K ratio of the compost material used to a desired N:P:K ratio in the final product.

Ammonium nitrate is a preferred source of nitrogen, although urea can also be used. Other nitrogen sources include ammonium sulphate and calcium nitrate. The preferred sources of potassium are potassium nitrate, potassium sulphate and potassium chloride. The preferred source of phosphorus is mono-ammonium phosphate. Additional sources of phosphate are ammonium ortho phosphate, simple super phosphate and triple superphosphate. The above sources of chemical fertilizer can also be readily sourced by using the pelleted enhanced organic fertilizer disclosed in patent application Ser. No. 09/692,835.

In another preferred embodiment of this invention, the pelleted pure organic fertilizer disclosed in patent application Ser. No. 09/692,834 can be added to the plant growing media to provide a source of nutrients and comply with "organic" standards for organically grown food. The pure organic fertilizer can be produced with various concentrations of N:P:K and used to adjust the nutrient levels in the final plant growth media.

The fertilizers are added to give a desired N:P:K ratio in the final product and are chosen to be suitable for the plants or crops to be grown. In general, the values in the N:P:K ratio will normally be in the range of 2–20:1–20:1–20, and thus include such commonly used ratios as 10:10:10, 5:10:10, 5:5:5, 10:2:2, 2:10:2, and 3:2:10. The source of nutrients will depend on the price of the nutrients, the desired levels of the guaranteed analysis of the nitrogen, phosphorus and potassium in the plant growing media and the agronomic requirements of the crops being grown.

The compost coarse/medium fractions, humified organic matter bulking agent, and nutrients, if necessary, are mixed until thoroughly homogenous. The plant growing media are then bagged for shipping.

EXAMPLE

Bio-stabilised compost was sieved to provide a coarse, medium, and fine fraction; the fine fraction was discarded. The coarse and medium fractions were combined in a ratio of 45:55 by weight, and 10% by weight of humified organic matter was added to the mixture. In this example, the humified organic material was composted duck manure, having a cation exchange capacity of 115 meq/100 g.

The growing medium was separated into three parts. The first was used without further additions; to the second was added 15% by weight brick fragments, and to the third was added 15% by weight shredded plastic. The three resulting growing media were each used to grow radish, lettuce and tomato. Controls were also grown in a commercial medium, which was Promix-BX(trade mark) supplied by Premier Peat Inc; this medium is a mix of sphagnum peat, perlite, vermiculite, lime and some conventional soluble chemical fertilisers. The growing media all performed better than the commercial medium. The number of waters required was reduced by 50%, and seed germination was achieved without any signs of damping off disease in the trial media compared to the commercial medium. The plant leaves in the trial media showed a deeper healthier green compared to the leaves in the commercial medium.

Where substantially pure hog and/or poultry manure is the source of manure used in the composting process, the medium and coarse fractions will likely contain phytotoxic levels of mineral salts, particularly sodium. Plant growing media made solely from such material may be unsuitable for many crops. To avoid salt phytotoxicicity, the medium and coarse fractions produced from composting hog and/or poultry manures should be mixed with adequate amounts of composted non-hog and/or poultry manure fractions to bring the salt levels well below the salt tolerance requirements of the intended crop to be grown in the plant growth medium.

What is claimed is:

1. A process for preparing a plant growing medium consisting essentially of:
   (i) screening a fully bio-stabilised compost material to provide a retained fraction of particles under about 1 cm diameter, and a rejected fraction of particles having a diameter in excess of about 1 cm;
   (ii) screening the retained fraction from step (i) into three further fractions to provide a rejected fines fraction below 1 mm, a medium fraction of from 1 mm to 4 mm, and a coarse fraction of from about 4 mm to 1 cm;
   (iii) remixing metered amounts of the retained medium and coarse fractions from step (ii) with an agronomically acceptable amount of humified organic matter having a particle size of less than 1 mm, and a cation exchange capacity of from about 100 meq/100 g to about 400 meq/100 g; and
   (iv) remixing metered amounts of the product produced in step (iii) with and agronomically acceptable amount of an agronomically acceptable bulking agent, to provide a plant growing medium for agricultural use.

2. A process according to claim 1 including the further step of adding in step (iv) sufficient fertiliser to provide a plant growing medium with a desired nitrogen:phosphorus:potassium ratio.

3. A process according to claim 2 wherein the N:P:K ratio is within the range 2–20:1–20:1–20.

4. A process according to claim 1 wherein the ratio of medium to coarse compost material is chosen from the group consisting of 1:1 by weight and 2:3 by weight, and the humified organic matter comprises from 10% to 60% by weight of the growing medium.

5. A process according to claim 1 wherein the bulking agent includes at least one component chosen from the group consisting of shredded plastic, brick fragments, wood chips, rock wool and vermiculite.

6. A process according to claim 1 wherein the ratio of compost fractions plus humified organic matter to the bulking agent is 1:1 by weight.

7. A process according to claim 3 wherein the fertiliser nitrogen source comprises at least one material chosen from the group consisting of ammonium nitrate, urea, calcium nitrate and ammonium orthophosphate.

8. A process according to claim 3 wherein the fertiliser potassium source comprises at least one material chosen from the group consisting of potassium nitrate, potassium sulphate and potassium chloride.

9. A process according to claim 3 wherein the fertiliser nitrogen, phosphorus and/or potassium source comprises at least one material chosen from the group consisting of enhanced organic fertilizers.

10. A process according to claim 3 wherein the fertiliser nitrogen, phosphorus and/or potassium source comprises at least one material chosen from the group consisting of pure organic fertilizers.

11. A process according to claim 3 wherein the fertiliser phosphorus source comprises at least one material chosen from the group consisting of triple superphosphate and organically based phosphate compounds.

12. A plant growing medium consisting essentially of a mixture of bio-stabilised compost particles having a size range of from 1 mm to 1 cm, humified organic matter having a particle size of less than 1 mm and a cation exchange capacity greater than 100 meq/100 g, and an agronomically acceptable amount of a bulking agent.

13. A plant growing medium according to claim 12 wherein the compost consists of a mixture particles having a size range of from 1 mm to 4 mm with particles having a size range of from 4 mm to 1 cm.

14. A plant growing medium according to claim 12 including two parts by weight of compost particles and one part by weight of bulking agent.

15. A plant growing medium according to claim 12 wherein the bulking agent includes at least one component chosen from the group consisting of shredded plastic, brick fragments, wood chips, rock wool and vermiculite.

16. A plant growing medium according to claim 12 wherein the N:P:K ratio is within the range 2–20:1–10:1–20.

17. A plant growing medium according to claim 12 wherein the N:P:K ratio is chosen from the group consisting of 10:10:10, 5:10:10, 5:5:5, 10:2:2, 2:10:2 and 3:2:10.

18. A plant growing medium according to claim 12 wherein the humified organic matter is chosen from the group consisting of compost, black earth and low grade charcoal.

* * * * *